United States Patent
Wang

(10) Patent No.: US 10,454,664 B2
(45) Date of Patent: Oct. 22, 2019

(54) PHASE SYNCHRONIZATION AND CHANNEL RECIPROCITY CALIBRATION OF ANTENNAS VIA TERMINAL FEEDBACK

(71) Applicant: Xiao-an Wang, Allentown, PA (US)

(72) Inventor: Xiao-an Wang, Allentown, PA (US)

( * ) Notice: Subject to any disclaimer, the term of this patent is extended or adjusted under 35 U.S.C. 154(b) by 181 days.

(21) Appl. No.: 15/869,042

(22) Filed: Jan. 12, 2018

(65) Prior Publication Data

US 2019/0222406 A1    Jul. 18, 2019

(51) Int. Cl.
| | | |
|---|---|---|
| *H04L 5/14* | (2006.01) | |
| *H04W 72/04* | (2009.01) | |
| *H04W 56/00* | (2009.01) | |
| *H04L 5/00* | (2006.01) | |
| *H04B 7/0452* | (2017.01) | |
| *H04W 88/08* | (2009.01) | |

(52) U.S. Cl.
CPC .......... *H04L 5/1469* (2013.01); *H04L 5/0048* (2013.01); *H04W 56/0035* (2013.01); *H04W 72/042* (2013.01); *H04B 7/0452* (2013.01); *H04W 88/08* (2013.01)

(58) Field of Classification Search
None
See application file for complete search history.

(56) References Cited

U.S. PATENT DOCUMENTS

| | | | | | |
|---|---|---|---|---|---|
| 2009/0290517 | A1* | 11/2009 | Rao | .......... | H01Q 3/267 370/280 |
| 2010/0117890 | A1* | 5/2010 | Vook | ...... | H04B 17/21 342/174 |
| 2010/0150013 | A1* | 6/2010 | Hara | ........... | H04L 25/0224 370/252 |
| 2010/0260060 | A1* | 10/2010 | Abraham | ......... | H04L 25/03343 370/252 |
| 2012/0020396 | A1* | 1/2012 | Hohne | ........... | H01Q 3/267 375/224 |
| 2012/0139776 | A1* | 6/2012 | Malmqvist | ............. | H01Q 3/267 342/174 |
| 2013/0034010 | A1* | 2/2013 | Gao | ........... | H04L 5/0023 370/252 |
| 2014/0269554 | A1* | 9/2014 | Shapira | ............ | H04B 17/0085 370/329 |

(Continued)

*Primary Examiner* — Kenny S Lin

(57) ABSTRACT

Multipoint broadcasting relying on channel reciprocity in a TDD network requires that the broadcasters be calibrated. In the cases where the relative amplitude profiles and nonlinear phases are time-invariant or slow-varying, broadcaster calibration reduces to phase synchronization. Methods and apparatus are described that provide broadcaster calibration and phase synchronization with terminal feedback and overcome the drawbacks of self-calibration. The methods and apparatus are capable of calibrating hundreds of broadcaster antennas in massive antenna applications while maintaining an extremely low overhead. Applications of the described methods and apparatus include multipoint broadcasting in wireless networks, also known as coordinated multipoint transmission, or CoMP, in LTE-A (long-term evolution, advanced) networks, and distributed MIMO, massive MIMO, massive beamforming, etc., in other networks including 5G and 802.11. Applications also include frequency and phase synchronization of a cluster of wireless devices.

25 Claims, 6 Drawing Sheets

(56) References Cited

U.S. PATENT DOCUMENTS

| | | | |
|---|---|---|---|
| 2015/0222336 A1* | 8/2015 | Yilmaz | H04B 7/024 370/252 |
| 2015/0341096 A1* | 11/2015 | Gao | H04B 7/0634 370/278 |
| 2016/0142094 A1* | 5/2016 | Papadopoulos | H04B 17/14 375/219 |
| 2017/0033951 A1* | 2/2017 | Zhang | H04B 17/00 |
| 2018/0019899 A1* | 1/2018 | Kuchi | H04B 7/022 |
| 2018/0048492 A1* | 2/2018 | Kundargi | H04L 25/0224 |
| 2018/0097667 A1* | 4/2018 | Yoo | H04B 17/14 |

\* cited by examiner

PHASE SYNCHRONIZATION AND CHANNEL RECIPROCITY CALIBRATION OF ANTENNAS VIA TERMINAL FEEDBACK

BACKGROUND

Field of Application

The following description relates generally to telecommunications systems and wireless communications systems.

Prior Art

Multipoint broadcasting in a wireless cellular network has the potential to increase the network capacity by many folds. In a traditional cellular network, the mobile users experience strong interference at cell edge from the signals of neighbor cells. Multipoint broadcasting coordinates multiple base station antennas, co-located or not, to transmit the signals to a set of mobile users in such a way that the signal intended for a mobile user is enhanced while the interference is minimized. Multipoint broadcasting has been adopted in LTE-A (Long-Term Evolution of $3^{rd}$ generation of wireless cellular network, Advanced) and is referred to as CoMP (Coordinated Multi-Point transmission). Multipoint broadcasting also takes other names and/or forms, such as distributed MIMO (multi-input multi-output), multi-user MIMO (MU-MIMO), spatial multiplexing, etc., in LTE-A and other evolving wireless networks such as 802.11. In addition, massive antenna arrays have also been deployed in wireless networks, where hundreds of antennas are involved in MIMO transmissions, further expanding multipoint broadcasting to massive MIMO and massive beamforming.

FIG. 1 illustrates an example multipoint broadcast system. Elements 102, 104, and 106 denote base stations 1, 2, and 3, respectively, and elements 152, 154, and 156 denote mobile stations 1, 2, and 3, respectively. Backhaul 100 connects base stations 1, 2, and 3 to allow high-speed information exchange among the base stations. In FIG. 1, base stations 1, 2, and 3 form a set of collaborating multipoint broadcasters. Mobile users 1, 2, and 3 form a set of recipients. Base stations 1, 2, and 3, and mobile users 1, 2, and 3 together form a multipoint-broadcast set. Base stations 1, 2, and 3 transmit the combinations of the signals intended for mobile users 1, 2, and 3. At each base station, the combination "weight" for each mobile user signal can be different. Through elaborate algorithms, at each mobile user the desired signal in the received signal is enhanced whereas the undesired signal or the interference is cancelled or minimized. For example, when the transmitted signals from base stations 1, 2, and 3 arrive at mobile user 1, the signals for mobile users 2 and 3 are cancelled out or minimized, while the signal for mobile user 1 is maximized or enhanced, thus the signal quality of mobile user 1 improves significantly. Similarly, mobile users 2 and 3 will also see significant improvement in the quality of their respective signals. The combining of the different mobile-user signals at each base station is commonly referred to as "precoding". The combining weight for each mobile user signal at for each base station is an element in a so called "precoding matrix".

In 802.11 networks, access points (APs) play a role similar to base stations in cellular networks. In describing prior art, the term "broadcaster" will be used to refer "base station" and "AP" and the like, and the term "terminal" will be used to refer "user equipment", "station", and "mobile user" and the like, in various wireless networks.

Multipoint broadcasting requires the knowledge of the downlink channel (i.e., the channel from broadcasters to terminals) to be available at collaborating broadcaster antennas for precoding. In a TDD (time-division duplex) network, broadcasters ideally can obtain the downlink-channel information from the uplink-channel information by channel reciprocity, which eliminates the need for feedback as is required in an FDD (frequency-division duplex) network.

Ideal channel reciprocity, however, exists only between the antennas of broadcasters and the terminals. The transceiver chain of a broadcaster antenna is generally different from that of a terminal antenna or other broadcaster antennas. Even if all antenna transceiver chains have the same design, the variations in manufacturing and in individual components, differences in independent oscillators, and changes in environments introduce differences in gains and phases between downlink and uplink channels, and causes the non-reciprocity of the channel. To restore the downlink and uplink channel reciprocity, the differences in gains and phases need to be known.

It is well known that for multipoint broadcasting, complete channel reciprocity is not necessary. Instead, the knowledge of the relative gains and phases of the broadcaster antennas is generally sufficient to realize the potentials of multipoint broadcasting. Obtaining the relative gains and phases of the broadcaster antennas is referred to as broadcaster calibration. There are also scenarios where the relative amplitudes of the broadcaster antennas are known or can be calibrated separately, leaving the relative phases of the broadcaster antennas the primary interest of the calibration. In such situations, broadcaster calibration becomes broadcaster phase synchronization.

There are various approaches to broadcaster calibration, including (1) design calibration, (2) self-calibration, and (3) terminal-assisted calibration.

In design calibration, all antenna transceivers in a broadcaster are jointly designed so that the relative gains and phases between antennas remain fixed once the broadcaster has been deployed in the field. An obvious shortcoming of design calibration is that it is not applicable when there are several broadcasters, especially when those broadcasters are not co-located. Even in a single broadcaster, it can be very difficult to have the relative antenna gains and phases in strict sync since each antenna transceiver may have different operating conditions, some of which may be random.

In self-calibration, calibration signals are sent and received between the broadcaster antennas so that the relative antenna gains and phases can be estimated. There are several prominent drawbacks in the self-calibration approach, however. One drawback is that the calibration process can be extremely long. The relative phases between antennas depends on many transceiver parameters such as gain settings at various gain stages. The phase calibration needs to be performed for each setting, and there can be thousands of or even more gain setting combinations. The relative antenna phases also depend on the frequency band and carrier frequency, adding more dimensions to the parameter space where phase calibration has to be conducted exhaustively. Moreover, to avoid interference during the calibration process, the broadcaster antennas transmit calibration signals in a serial fashion, i.e., only one antenna can transmit at any given time. For a massive antenna array with hundreds of antennas, even calibration for a fixed transceiver setting may be too long. When the entire parameter space is taken into account, the calibration time can be prohibitive.

Another drawback of self-calibration is that the relative antenna gains and especially the relative antenna phases are time-variant and thus the calibration process must be repeated periodically. The variations in environment temperature, the antenna loads, and the transmit power change the thermal distribution over antenna transceivers and thus change the relative antenna phases. Transceiver component aging further contributes to the time-variance of the relative antenna phases. The network capacity can be severely reduced by repeated long calibrations.

Another drawback of self-calibration is that it is only applicable to a single broadcaster, as the self-calibration approach is based on the condition that all antenna transceivers are driven by a common oscillator in the broadcaster. For differently located broadcasters with independently running oscillators, additional steps must be in place to phase-synchronize those broadcaster oscillators. Oscillator synchronization not only adds more time to the already lengthy calibration process, it also requires a generally much greater repeating frequency than self-calibration does, further diminishing the network capacity. In addition, oscillator synchronization over long distances requires much higher transmission power than single-broadcaster calibration, generating interferences to neighbor broadcasters and terminals in service.

Still another drawback of self-calibration is that it disrupts network service. During the long calibration process, the network must stop servicing the users. This may not be acceptable to networks, such as cellular networks, where continuous and uninterrupted service is expected.

In terminal-assisted calibration, pilot signals are sent from the broadcaster to the terminal. The terminal estimates the downlink channel from the pilot, and sends the downlink channel estimation back to the broadcaster. The terminal also sends pilot signals to the broadcaster so that the broadcaster also estimates the uplink channel. The broadcaster then derives the relative gains and phases of the antennas. One drawback of terminal-assisted calibration is that the downlink channel feedback can have a large overhead. U.S. Pat. No. 8,478,203 discloses an approach that allows broadcaster phase synchronization with a much smaller feedback overhead.

Massive antenna configurations with tens or hundreds of antennas at the broadcaster are becoming crucial in the new generation of wireless networks including 5G cellular and 802.11. Phase synchronization and channel reciprocity calibration of the broadcasters is key to achieving the full potentials of distributed MIMO and beamforming with massive antennas in TDD networks. Yet the large number of antennas poses a great challenge to phase synchronization and channel reciprocity calibration. Accordingly, methods, apparatus, and systems that provide efficient, reliable, and accurate broadcaster calibration and phase synchronization are highly desired.

SUMMARY

The following presents a summary of exemplary embodiments in the subject disclosure. The summary is intended to be neither an extensive overview of all contemplated embodiments nor a delineation of the scope of any or all embodiments. The purpose of the summary is to present some concepts of the invention in a simplified form as a prelude to the more detailed descriptions that are presented later.

In accordance with one or more embodiments, the broadcaster set sends a downlink calibration signal to the terminal set. The downlink calibration signal includes the calibration tones each of which is mapped to a broadcaster antenna. The terminal set performs estimation of the downlink calibration tones and feeds the estimation back to the broadcaster set. The terminal set also sends an uplink calibration signal to the broadcast set. From the downlink calibration tone feedback and the uplink calibration signal, the broadcaster set is able to derive the broadcaster calibration coefficients for each broadcaster antenna at the tone frequencies, and extend the broadcaster calibration coefficients to all frequencies. The downlink calibration signal is shown to be very effective and efficient in calibrating large number of broadcaster antennas.

In accordance with some more embodiments, the downlink calibration signal includes multiple antenna mappings. Multiple antenna mappings increase the calibration tone density, which in turn increases the accuracy of deriving the broadcaster calibration functions from the broadcaster calibration coefficients on the tone-frequency subsets. Further, when there are multiple terminal antennas in the terminal set, multiple antenna mappings enable antenna diversity that mitigates the effect of channel nulls in multipath channels.

In accordance with still more embodiments, the calibration process is translated to the phase synchronization process. If the fixed/slow-varying components, the relative amplitude profiles and the nonlinear phases, of the relative broadcaster calibration function are known, the calibration process simply becomes a parameter estimation problem, in which only the relative linear phases and a single gain over the signal bandwidth are to be estimated. The calibration error can be greatly reduced as the estimation of the calibration functions is reduced to estimation of two or three parameters. Methods are disclosed to extract and update the relative amplitude profiles and nonlinear phases.

In accordance with further embodiments, the broadcaster-assisted terminal calibration is enabled by the terminal-assisted broadcaster calibration, in which the broadcaster set additionally estimates the terminal calibration coefficients and feeds them back to the terminal. This allows the terminal set to perform the uplink beamforming to improve the quality of the uplink.

DETAILED DESCRIPTION

The disclosed subject matter will now be described more fully hereinafter with reference to the accompanying drawings, in which some, but not all aspects or embodiments, are shown with like numerals referring to like elements throughout the description. Various aspects may be embodied in many different forms and should not be construed as limited to the embodiments set forth herein. Specific details are described for the purpose of providing a thorough understanding of the subject innovation. It may be evident, however, that the disclosed subject matter may be practiced without these specific details. In other instances, well-known methods, procedures, and components have not been described in detail so as not to obscure the subject innovation.

Various terms are used in the specification to describe various concepts of the invention. Hereinafter the term "antenna" refers to an "effective" antenna. An effective antenna may be a physical antenna, but it may also be a collection of several physical antennas that collectively transmit a common signal such that the transmitted common signal is perceived to come from a single antenna by a receiving device. When distinction is needed, "physical antenna" and/or "effective antenna" will be used.

In the prior art section of this specification, the term "broadcaster" is used to refer "base station" and "AP" and the like, and the term "terminal" is used to refer "user equipment", "station", and "mobile user" and the like. Such conventions help facilitating understanding the various embodiments described herein. However, the terms broadcaster and terminal are not limited to such conventions. In particular, some embodiments are also applicable when the broadcaster refers to a mobile user and the terminal refers to a base station or an AP. For example, when the many physical antennas from a base station are beamforming to a mobile user that has multiple antennas, it is desirable for the mobile user to beamform to the base station as well, in order to increase the quality of the uplink channel. Since in this situation the mobile user has more antennas than the base station (the base station has only one effective antenna because of beamforming), it will be advantageous for the mobile user to assume the role of the broadcaster and for the base station to assume the role of the terminal in the calibration and phase synchronization processes disclosed hereinafter.

The downlink and the uplink are used to refer the different directions of the communication link between the broadcaster and the terminal. The link from the broadcaster to the terminal is the downlink, and the link from the terminal to the broadcaster is the uplink.

Figure 2:
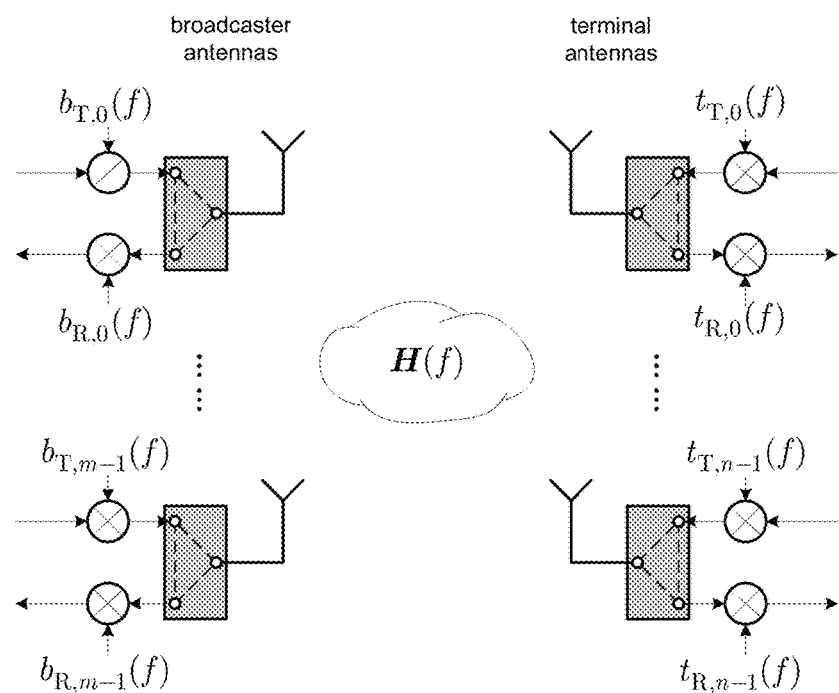
FIG. 2 illustrates the phenomenon of channel non-reciprocity from the non-ideal gain and phase distributions in antenna transceiver chains.

Let n and m be the numbers of the broadcaster antennas and terminal antennas, respectively. FIG. 2 illustrates the phenomenon of channel non-reciprocity from the non-ideal gain and phase distributions in antenna transceiver chains. In FIG. 2, complex numbers $b_{T,i}(f)$ and $b_{R,i}(f)$ denote the gain and phase in the transmitter chain and in the receiver chain, respectively, of broadcaster antenna i, i=0, 1, . . . , n−1, complex numbers $t_{T,i}(f)$ and $t_{R,i}(f)$ denote the gain and phase in the transmitter chain and in the receiver chain, respectively, of terminal antenna i, i=0, 1, . . . , m−1, and H(f) denote the n×m MIMO channel matrix from broadcaster antennas to terminal antennas. Note that the above quantities depend on frequency f. In matrix notation, the downlink channel $H_{DL}(f)$ and uplink channel $H_{UL}(f)$ can be expressed as $$H_{DL}(f)=T_R(f)H(f)B_T(f), H_{UL}(f)=B_R(f)H^T(f)T_T(f), \quad (1)$$

with $$T_T(f)=\text{diag}\{t_{T,0}(f), \ldots, t_{T,n-1}(f)\}, T_R(f)=\text{diag}\{t_{R,0}(f), \ldots, t_{R,n-1}(f)\}$$

$$B_T(f)=\text{diag}\{b_{T,0}(f), \ldots, b_{T,m-1}(f)\}, B_R(f)=\text{diag}\{b_{R,0}(f), \ldots, b_{R,m-1}(f)\}, \quad (2)$$

where the superscript T denotes the matrix transpose. Eq. (1) can be rearranged as $$H_{UL}^T(f)B(f)=T(f)H_{DL}(f), \quad (3)$$

where $$T(f) = T_T(f)T_R^{-1}(f) = \quad (4)$$

$$\text{diag}\left\{\frac{t_{T,0}(f)}{t_{R,0}(f)}, \cdots, \frac{t_{T,n-1}(f)}{t_{R,n-1}(f)}\right\} = \text{diag}\{t_0(f), \cdots, t_{n-1}(f)\}$$

$$B(f) = B_T(f)B_R^{-1}(f) = \text{diag}\left\{\frac{b_{T,0}(f)}{b_{R,0}(f)}, \cdots, \frac{b_{T,m-1}(f)}{b_{R,m-1}(f)}\right\} =$$

$$\text{diag}\{b_0(f), \cdots, b_{m-1}(f)\}.$$

The diagonal elements in B(f) and T(f) will be referred to as broadcaster calibration functions and terminal calibration functions, respectively. Broadcaster calibration function $b_i(f)$ is associated with broadcaster antenna i, and terminal calibration function $t_l(f)$ is associated with terminal antenna l. For a given frequency f, the values of $b_i(f)$ and $t_l(f)$ represent the broadcaster calibration coefficient for broadcaster antenna i and terminal calibration coefficient for terminal antenna l, respectively. B(f) and T(f) are referred to as the broadcaster calibration matrix and the terminal calibration matrix, respectively. If the downlink channel and uplink channel are reciprocal, $H_{UL}^T(f)=a(f)H_{DL}(f)$ will hold, where a(f) is a scalar that may depend on frequency f. It can be seen that the presence of B(f) and T(f) makes the downlink and uplink channels no longer reciprocal unless both B(f) and T(f) are proportional to the identity matrix. To derive $H_{DL}(f)$ from $H_{UL}(f)$ or vice versa, B(f) and T(f) need to be obtained first. The process of obtaining B(f) and T(f) is referred to as "calibration". When the relative amplitude information of B(f) and T(f) is known and/or the focus is to acquire the relative phase information, the calibration process is also referred to as "phase synchronization".

It is well known that for downlink distributed MIMO and beamforming with n=1, full knowledge of the downlink channel $H_{DL}(f)$ is not necessary (U.S. Pat. No. 8,478,203). That is, while from Eq. (3), $$H_{DL}(f)=T^{-1}(f)H_{UL}^T(f)B(f), \quad (5)$$

$H_{DL}(f)$ can be completely derived from $H_{UL}(f)$ with the knowledge of B(f) and T(f), the "partial" downlink channel, $$H_{DL,p}(f)=H_{UL}^T(f)B(f) \quad (6)$$

would be sufficient. To see this, consider the zero-forcing (ZF) precoding in distributed MIMO. Instead of using $H_{DL}(f)$, the precoding matrix P(f) uses the partial downlink channel $H_{DL,p}(f)$:

$$P(f)=H_{DL,p}^H(f)[H_{DL,p}(f)H_{DL,p}^H(f)]^{-1}, \quad (7)$$

where the superscript H denotes the Hermitian matrix transpose. The equivalent downlink channel with precoding is then $$H_{DL}(f)P(f)=H_{DL}(f)H_{DL,p}^H(f)[H_{DL,p}(f)H_{DL,p}^H(f)]^{-1}=T(f). \quad (8)$$

Since T(f) is diagonal, the signal from the broadcaster antennas to each terminal antenna is separated without interference from signals to other terminal antennas. The effect of each complex gain in T(f) can be compensated by the receiver of the corresponding terminal antenna. It can thus be seen that the partial downlink channel $H_{DL,p}(f)$ is sufficient for precoding in distributed MIMO. This conclusion also similarly extends to minimum mean-square error (MMSE) precoding, and to beamforming with n=1.

It should be noted that the performance of distributed MIMO and beamforming remains unchanged if a scalar is multiplied to B(f) while the total transmitted power is kept the same. Therefore only the relative amplitudes and phases of the diagonal elements of B(f) need to be known, instead of the absolute amplitudes and phases.

In accordance with one or more embodiments, in broadcaster antennas jointly transmit a downlink calibration signal. The in broadcaster antennas may belong either to one broadcaster, such as in massive antenna beamforming, or to several broadcasters, such as in distributed MIMO. Hereinafter the set of the broadcasters to which those in broadcaster antennas belong is referred to as the broadcaster set. The downlink calibration signal includes a collection of calibration tones of different frequencies within the signal bandwidth of interest. The signal bandwidth depends on the network. For example, in an LTE network, the signal bandwidth can be up to 20 MHz, and in an 802.11ac network, the signal bandwidth can be up to 160 MHz. However, the signal bandwidth also depends on the resource allocation by the network. For example, the network may allocate a portion of the total bandwidth for communications between certain broadcasters and terminals. Hereinafter the term signal bandwidth refers to the bandwidth of the communications link between the broadcasters and the terminals of interest.

Figure 3:
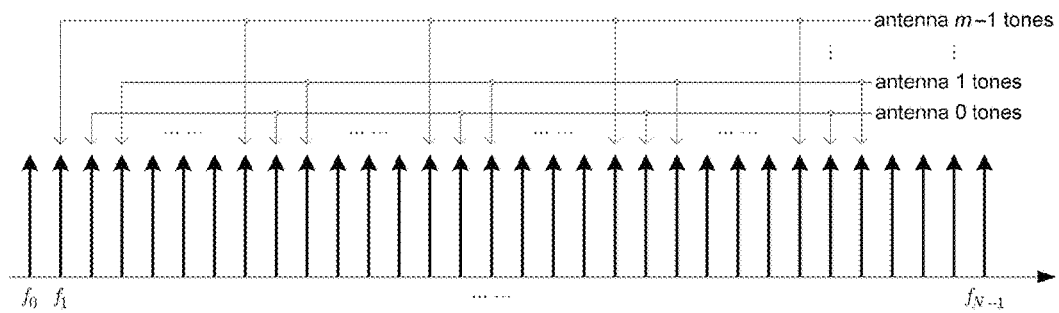
FIG. 3 illustrates a frequency-domain representation of an exemplary downlink calibration signal with an exemplary antenna mapping.

In the downlink calibration signal, each calibration tone is transmitted from one of the broadcaster antennas. FIG. 3 shows a frequency-domain representation of an exemplary downlink calibration signal. In FIG. 3, the downlink calibration signal has N calibration tones whose frequencies form a tone-frequency set $F=\{f_0, f_1, \ldots, f_{N-1}\}$. The tone frequencies in F can be either uniformly spaced or non-uniformly spaced.

FIG. 3 also shows an exemplary antenna mapping with respect to calibration tones. An antenna mapping partitions the tone-frequency set F into m disjoint subsets $F_0$, $F_1, \ldots, F_{m-1}$, each of which is mapped to one of the m broadcaster antennas such that the calibration tones in $F_i$ are transmitted from broadcaster antenna i. Referring to FIG. 3, the calibration tones that are marked as "antenna-0 tones" are transmitted from broadcaster antenna 0, and the calibration tones marked as "antenna-1 tones" from broadcaster antenna 1, and so on. The amplitude and phase of calibration tone at frequency $f_k$ are specified by a complex number $s(f_k)$.

In OFDM (orthogonal frequency division multiplexing) systems, the downlink calibration signal may occupy some or all subcarriers of one or more OFDM symbols. The antenna mapping partitions the set of subcarriers that carry the calibration tones into m disjoint subsets. The OFDM symbol in the downlink calibration signal may also carry signaling and control information if there are subcarriers that are not used by calibration tones.

On the terminal side, the downlink calibration signal is received by n terminal antennas. The n terminal antennas may belong either to a single terminal, such in multi-antenna beamforming, or to multiple terminals, such as in distributed MIMO. Hereinafter the set of the terminals to which those n terminal antennas belong is referred to as the terminal set. The terminal set performs downlink calibration tone estimation. With only one antenna mapping in the downlink calibration signal, the downlink channel $H_{DL}(f)$ has dimension n×1:

$$H_{DL}(f)=[d_0(f)\ d_1(f) \ldots d_{n-1}(f)]^T. \quad (9)$$

The tone is received from the terminal antennas as an n×1 vector r(f), which is given by $$r(f)=H_{DL}(f)s(f)+z(f), \quad (10)$$

where s(f) be the complex amplitude of the calibration tone at frequency f, and z(f) represents the noise in the received signal vector. The n×1 vectors r(f) on tone-frequency set F are referred to as downlink calibration tone estimates. Alternatively, the downlink calibration tone estimates may take the form of r(f)/s(f), if the terminal set has the knowledge of s(f). In the OFDM system, if there are several OFDM symbols with the same antenna mapping, the tone-carrying subcarriers may be averaged over those OFDM symbols before estimating the downlink calibration tones.

Upon obtaining the downlink calibration tone estimates, the terminal set feeds these estimates back to the broadcaster set. If n>1, there are several options in how the tone estimates are fed back. The first option is to feed back the downlink calibration tone estimates from all n terminal antennas. If there are multiple terminals, each terminal feeds back a portion of the downlink calibration tone estimates that correspond to its antennas. The second option is to feed back the downlink calibration tone estimates from only one terminal antenna, say, terminal antenna 0. Such an option reduces the feedback overhead. The third option is to feed back the downlink calibration tone estimates from several, but not all, terminal antennas.

In addition to feeding back the downlink calibration tone estimates, the terminal set also transmits an uplink calibration signal, from which the uplink channel information on the tone-frequency set F can be obtained at the broadcaster set. The uplink calibration signal may be the same as the uplink reference signal (or uplink training signal, uplink pilot, etc.) that exists in typical wireless networks, such as LTE and 802.11, and is used for uplink channel estimation. There are many well-established algorithms to estimate the uplink channel from the uplink reference signal. Alternatively, the uplink calibration signal can be specially designed for extracting the uplink channel information on the tone-frequency set F instead of on all frequencies of interest. To distinguish from the uplink reference signal, the specially designed uplink calibration signal is referred to as the "dedicated" uplink calibration signal, whereas the uplink reference signal, when used as the uplink calibration signal, is referred to as the "standard" uplink calibration signal.

When n>1, the number of the uplink channels to be estimated depend on how the downlink calibration tone estimates are fed back. If the downlink calibration tone estimates are from only one terminal antenna, then only m uplink channels between that terminal antenna and the m broadcaster antennas need to be estimated. On the other hand, if the downlink calibration tone estimates are from all n terminal antennas, all mn uplink channels between m broadcaster antennas and n terminal antennas are to be estimated.

When the broadcaster set receives the downlink calibration tone estimates and the uplink calibration signal, the broadcaster set derives the broadcaster calibration coefficient for each calibration tone. If the downlink calibration tone estimates from all n terminal antennas are available, the downlink channel at frequency f is estimated to be $$\tilde{H}_{DL}(f)=r(f)/s(f)=[\tilde{d}_0(f)\ \tilde{d}_1(f) \ldots \tilde{d}_{n-1}(f)]^T. \quad (11)$$

From the uplink calibration signal, the uplink channel at frequency f is estimated to be $$\tilde{H}_{UL}(f)=[\tilde{u}_0(f_k)\ \tilde{u}_1(f) \ldots \tilde{u}_{n-1}(f)]. \quad (12)$$

Given the estimated downlink and uplink channels $\tilde{H}_{DL}(f)$ and $\tilde{H}_{UL}(f)$, the broadcaster and terminal calibration matrices $B(f)$ and $T(f)$ can be estimated by finding the solution to the following constrained least-square (LS) problem:

$$\text{minimize} \\ \varepsilon = tr\left\{[\tilde{H}_{UL}^T(f)B(f) - T(f)\tilde{H}_{DL}(f)]^T[\tilde{H}_{UL}^T(f)B(f) - T(f)\tilde{H}_{DL}(f)]\right\} \quad (13) \\ \text{subject to } t_0(f) = 1$$

where tr $\{A\}$ denotes the trace of matrix A. The constraint $t_0(f)=1$ in Eq. (13) is to avoid the trivial solution of $B(f)=0$ and $T(f)=0$. Note that the constraint in Eq. (13) can be made on a different antenna instead of terminal antenna 0. A different constraint may also be used, such as $$\sum_{i=0}^{n-1} |t_i(f)|^2 = 1. \quad (14)$$

With only one antenna mapping in the downlink calibration signal, the dimension of the broadcaster calibration matrix is $1\times1$, i.e., $B(f)=[b(f)]$, where $b(f)$ denotes the broadcaster calibration coefficient at tone frequency f. It follows from Eq. (13) that the solution $\tilde{b}(f), \tilde{t}_0(f), \ldots, \tilde{t}_{n-1}(f)$ satisfies $$\begin{bmatrix} \tilde{u}_0(f) \\ \tilde{u}_1(f) \\ \vdots \\ \tilde{u}_{n-1}(f) \end{bmatrix} \tilde{b}(f) = \begin{bmatrix} \tilde{d}_0(f)\tilde{t}_0(f) \\ \tilde{d}_1(f)\tilde{t}_1(f) \\ \vdots \\ \tilde{d}_{n-1}(f)\tilde{t}_{n-1}(f) \end{bmatrix}. \quad (15)$$

With constraint $\tilde{t}_0(f)=1$, the constrained LS solution is given by $$\tilde{b}(f) = \frac{\tilde{d}_0(f)}{\tilde{u}_0(f)} \quad (16)$$

$$\tilde{t}_i(f) = \frac{\tilde{u}_i(f)\tilde{d}_0(f)}{\tilde{d}_i(f)\tilde{u}_0(f)}, i = 1, \ldots, n-1.$$

Eq. (16) shows that the broadcaster calibration coefficients depend only on the channels between the broadcaster antennas and terminal antenna 0. This justifies feeding back downlink calibration tone estimates from only one terminal antenna.

It should be pointed out that if the constraint in Eq. (14) is used instead, the solution will be the same as Eq. (16) up to a constant factor, and thus the two constraints are considered to be equivalent. It should also be emphasized that both constraints are mathematical but not physical, therefore the solution in Eq. (16), and the solutions described hereinafter under either constraint, may not correspond to the values of the calibration functions in Eq. (4), which is based on the physical descriptions of the transceiver chain. Nonetheless, neither constraint alters the performance of precoding in distributed MIMO and beamforming.

For multipath channels, the channel amplitudes can be zero or very low at some frequencies, which are referred to as channel nulls, thereby causing large estimation errors in antenna calibration coefficients when those very low amplitudes appear in the denominators in Eq. (16). One approach to mitigate the impact of the channel nulls is to modify Eq. (16) to get $$\tilde{b}(f) = \frac{\tilde{d}_0(f)\tilde{u}_0^*(f)}{|\tilde{u}_0(f)|^2 + \zeta_0} \quad (17)$$

$$\tilde{t}_i(f) = \frac{\tilde{u}_i(f)\tilde{d}_0(f)\tilde{d}_i^*(f)\tilde{u}_0^*(f)}{|\tilde{d}_i(f)\tilde{u}_0(f)|^2 + \zeta_i}, i = 1, \ldots, n-1,$$

where $\zeta_i>0$, $i=0, 1, \ldots, n-1$ are small positive real numbers, referred to as "regularization parameters", such that they are negligible with respect to the average channel energy but are able to keep the amplitudes of the antenna calibration coefficients from being too large at channel nulls. The regularization parameters may be predetermined. They may also be chosen based on channel conditions such as SNR (signal-to-noise ratio).

If the broadcaster calibration coefficients are the only calibration coefficients of interest in a practice, the terminal calibration coefficients in Eq. (16) or Eq. (17) need not to be computed.

After the broadcaster calibration coefficients become available, the broadcaster set derives the broadcaster calibration functions from the broadcaster calibration coefficients. For broadcaster antenna i, its calibration coefficients are only available on the tone-frequency subset $F_i$. For the purpose of precoding, however, the broadcaster calibration coefficients on all frequencies of interest need to be derived. The broadcaster calibration coefficient as a function of the frequency is referred to as the broadcaster calibration function. For broadcaster antenna i, its broadcaster calibration function is denoted as $b_i(f)$.

The size of $F_i$ may be a small fraction of the total number of frequencies at which the broadcaster calibration coefficients are needed. For example, in OFDM systems, the number of subcarriers carrying the calibration tones for a broadcaster antenna may be from several to several tens, but the total number of subcarriers may be in hundreds or thousands. With a properly designed $F_i$, it is possible to derive $b_i(f)$ over all frequencies from $\tilde{b}_i(f)$, $f \in F_i$, as $b_i(f)$ is generally sufficiently smooth.

One approach to deriving $b_i(f)$ over all frequencies from $\tilde{b}_i(f)$, $f \in F_i$, is interpolation/extrapolation. The values of $b_i(f)$ on the frequencies between two adjacent frequencies in $F_i$ are obtained from interpolation. The values of $b_i(f)$ on the frequencies below the minimum frequency and above the maximum frequency in $F_i$, if there are any, are obtained from extrapolation. There are many well understood interpolation and extrapolation algorithms, the details of which are thus not included herein. Additionally, the true values of $\tilde{b}_i(f)$, $f \in F_i$, even if when the sampling is sparse, may still be well correlated, while the estimation errors of $\tilde{b}_i(f)$, $f \in F_i$, may be independent or much less correlated. Thus means of error reduction, such as low-pass filtering, can be applied in combination of interpolation and extrapolation, which may further improve the accuracy of the broadcaster calibration function $b_i(f)$.

An alternative approach to deriving $b_i(f)$ is model fitting. As an example, the broadcaster calibration function $b_i(f)$ may be modeled as follows:

$$b_i(f) = (\gamma_{i,1}f + \gamma_{i,0})\exp[j(2\pi\lambda_{i,1}f + \lambda_{i,0})] \quad (18)$$

where $\gamma_{i,1}$, $\gamma_{i,0}$, $\lambda_{i,1}$, and $\lambda_{i,0}$ are real numbers. Ideally, the transceiver chain has a constant gain and zero phase within the signal bandwidth. The term $\gamma_{i,1}$f in the amplitude models the deviation of $b_i(f)$ from the ideal gain, and the term $2\pi\lambda_{i,1}f+\lambda_{i,0}$ in the phase models the deviation of $b_i(f)$ from the zero phase. It should be noted that more terms may be included in Eq. (18) to model the higher order effects in amplitude and/or in phase. As another example, $b_i(f)$ may also be modeled as $$b_i(f)=\exp[\gamma_{i,1}f+ln(\gamma_{i,0})+j(2\pi\lambda_{i,1}f+\lambda_{i,0})] \quad (19)$$

Note that in the event of $\gamma_{i,1} \to 0$ and $\gamma_{i,0}=1$, the two models in Eq. (18) and Eq. (19) tend to be identical. In general, if the model comprises the amplitude parameter vector $\gamma$ and the phase parameter vector $\lambda$, i.e., $b_i(f)=b_i(f, \gamma, \lambda)$, the parameter vectors can be estimated by finding solutions to the following:

$$\arg\min_{\gamma,\lambda} \sum_{f \in F_i} |b_i(f, \gamma, \lambda) - \tilde{b}_i(f)|^2. \quad (20)$$

Eq. (20) can be solved by various well known numerical routines. Once $\gamma$ and $\lambda$ are solved, $b_i(f)=b_i(f, \gamma, \lambda)$ will be the broadcaster calibration function for broadcaster antenna i.

In distributed MIMO and beamforming, the relative broadcaster calibration functions may be used. The relative broadcaster calibration functions with respect to broadcaster antenna j, $\beta_{j,i}(f)$, are defined as follows:

$$\beta_{j,i}(f)=b_i(f)/b_j(f), i=1, \ldots, m-1 \quad (21)$$

Accordingly broadcaster antenna j is referred to as the reference broadcaster antenna when the relative broadcaster calibration functions are used.

For n>1 beamforming, the optimal beamforming weights can be obtained from the singular value decomposition of the downlink channel $H_{DL}(f)$.

$$H_{DL}(f)=U(f)\Sigma(f)V^H(f). \quad (22)$$

The broadcaster beamforming weights are the column vector in the unitary matrix V(f) that corresponds to the largest singular value in the diagonal rectangular real matrix $\Sigma(f)$. The terminal beamforming weights are the column vector in the unitary matrix U(f) that also corresponds to the largest singular value in $\Sigma(f)$. Since it is the complete downlink channel $H_{DL}(f)$, not the partial downlink channel $H_{DL,p}(f)$, that is required for computing the optimal beamforming weights, both the broadcaster calibration functions and the terminal calibration functions are needed at the broadcaster to derive $H_{DL}(f)$ from $H_{UL}(f)$ according to Eq. (5).

Deriving terminal calibration functions $u_i(f)$, i=0, 1, ... n−1 may follow the procedures similar to deriving broadcaster calibration functions described hereinabove. The terminal calibration coefficients are calculated first over the tone-frequency set F according to Eq. (16) or Eq. (17). Note that the terminal calibration coefficients of each terminal antenna are available at all tone frequencies in F. This is in contrast to the broadcaster calibration coefficients of each broadcaster antenna, which are available only on a subset of F. The terminal calibration functions can be derived from the terminal calibration coefficients on F, using methods such as interpolation/extrapolation, model fitting, etc.

Figure 1:
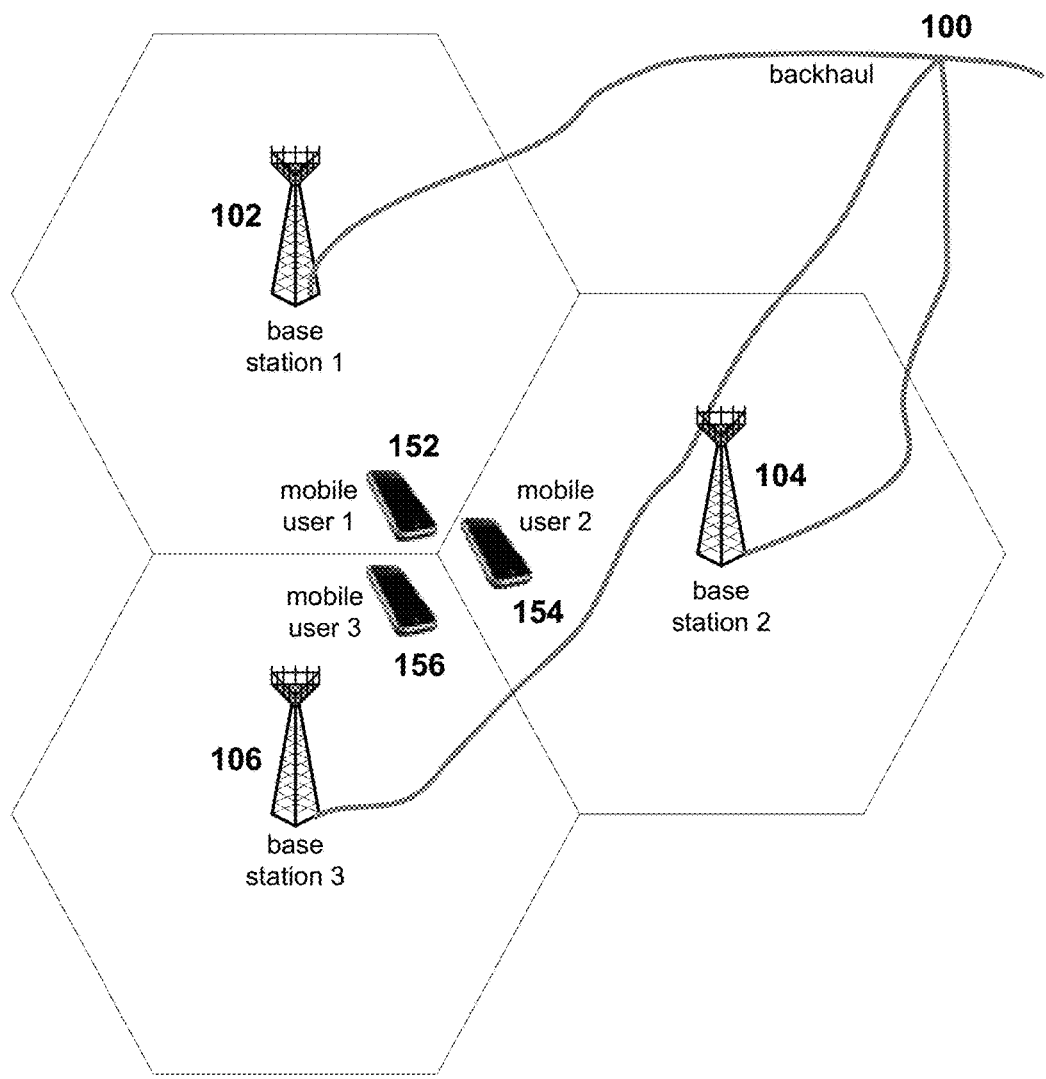
FIG. 1 illustrates a wireless cellular network that comprises a multipoint broadcast set.

If there are multiple broadcasters in the broadcaster set as in distributed MIMO, each broadcaster is able to derive the broadcaster calibration coefficients and calibration functions for its own antennas. Each broadcaster is also able to derive terminal calibration coefficients but only on those subsets of F that are associated with its own antennas. Alternatively, the broadcasters may exchange information via the backhauls that connect them (such as backhaul 100 in FIG. 1) such that at least one broadcaster has the information necessary to compute all calibration functions. The backhaul also distributes the calibration functions to all broadcasters for precoding.

Figure 4:
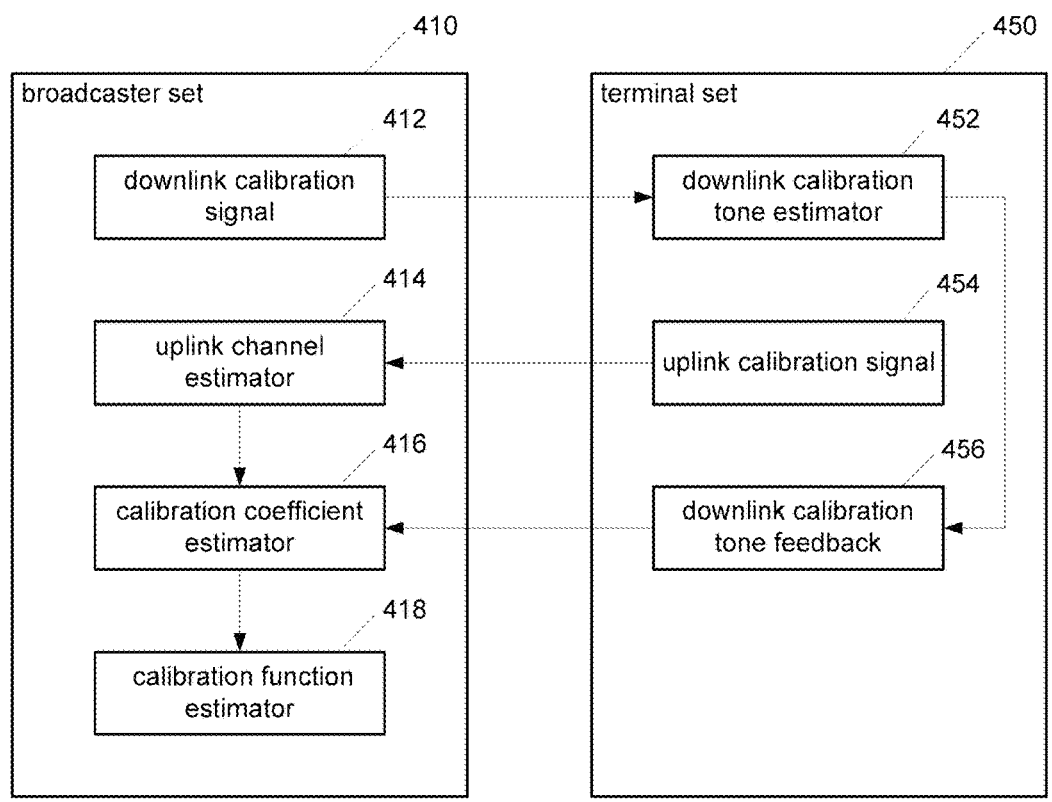
FIG. 4 illustrates an example diagram of terminal-assisted calibration.

FIG. 4 illustrates an example diagram of terminal-assisted calibration. Broadcaster set 410 comprises downlink calibration signal apparatus 412, uplink channel estimator 414, calibration coefficient estimator 416, and calibration function estimator 418. Terminal set 450 comprises downlink calibration tone estimator 452, uplink calibration signal apparatus 454, and downlink calibration tone feedback apparatus 456. The operations of terminal-assisted calibration is described as follows.

Downlink calibration signal apparatus 412 sends the downlink calibration signal to terminal set 450. Downlink calibration tone estimator 452 performs estimation of the downlink calibration tones, and the outputs the estimation results to downlink calibration tone feedback apparatus 456. Uplink calibration signal apparatus 454 sends the uplink calibration signal to broadcaster set 410. Note that the order of operations of downlink calibration signal apparatus 412 and uplink calibration signal apparatus 454 can be switched without changing the functionalities of the calibration, i.e., downlink calibration signal apparatus 412 may send the downlink calibration signal to terminal set 450 either before or after uplink calibration signal apparatus 454 sends the uplink calibration signal to broadcaster set 410. Downlink calibration tone feedback apparatus 456 feeds back the downlink calibration tone estimates to broadcaster set 410.

In FIG. 4, uplink channel estimator 414 receives uplink calibration signal and performs uplink channel estimation at the tone frequencies of the downlink calibration signal. Calibration coefficient estimator 416 receives the downlink calibration tone feedback and the uplink channel estimation at the tone frequencies, and performs estimation of the broadcaster calibration coefficients. If the terminal calibration coefficients are also needed, for example in the case of n>1 beamforming, calibration coefficient estimator 416 also performs estimation of the terminal calibration coefficients. Calibration function estimator 418 performs estimation of the broadcaster calibration functions from the output of calibration coefficient estimator 416, and if needed, also performs estimation of the terminal calibration functions.

The example below demonstrates the capability of the downlink calibration signal in massive MIMO applications. Assume the number of broadcaster antenna in m=256. Also assume that the system is OFDM with 80-MHz bandwidth, 15-kHz subcarrier spacing, and 5120 subcarriers in one OFDM symbol. If the downlink calibration signal is one OFDM symbol long, each antenna will transmit 20 calibration tones if the antenna mapping allocates the same number of calibration tones to each broadcaster antenna. The broadcaster calibration function for each antenna can then be reconstructed from 20 calibration tones. Moreover, the downlink calibration signal is only about 67 μs in time, which is very short and thus very efficient considering that there are 256 broadcaster antennas to be calibrated.

Figure 5:
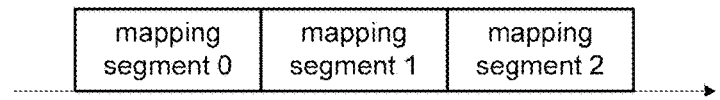
FIG. 5 illustrates an exemplary downlink calibration signal with three antenna mappings.

In accordance with some other embodiments, in broadcaster antennas jointly transmit a downlink calibration signal that has more than one antenna mapping. FIG. 5 illustrates an exemplary downlink calibration signal with three antenna mappings. There are three mapping segments in the downlink calibration signal, namely, mapping segment 0, mapping segment 1, and mapping segment 2. Each mapping segment has the same N calibration tones in the tone-frequency set F as shown in FIG. 3, but may have a different antenna mapping. For example, the antenna mapping in mapping segment 0 may partition F into disjoint subsets $F_{0,0}, F_{0,1}, \ldots, F_{0,m-1}$, and the antenna mapping in mapping segment 1 may partition F into disjoint subsets $F_{1,0}, F_{1,1}, \ldots, F_{1,m-1}$, and so on. The three mapping segments are arranged sequentially in time, with mapping segment 0 being the first in the downlink calibration signal, followed by mapping segment 1, which is in turn followed by mapping segment 2, as shown in FIG. 5. In OFDM systems, a mapping segment may occupy some of all subcarriers of one or more OFDM symbols.

Upon receiving the downlink calibration signal, the terminal set performs estimation of the downlink calibration tones. Let p be the number of mapping segments in the downlink calibration signal, then for each tone frequency, the terminal set receives p downlink calibration tones, each from one of the mapping segments. For a given tone frequency f, the downlink channel $H_{DL}(f)$ has dimension n×p:

$$H_{DL}(f) = \begin{bmatrix} d_{0,0}(f) & d_{0,1}(f) & \ldots & d_{0,n-1}(f) \\ d_{1,0}(f) & d_{1,1}(f) & \ldots & d_{1,n-1}(f) \\ \ldots & \ldots & \ldots & \ldots \\ d_{p-1,0}(f) & d_{p-1,1}(f) & \ldots & d_{p-1,n-1}(f) \end{bmatrix}^T. \quad (23)$$

Let $s_q(f)$ be the complex amplitude of the calibration tone in mapping segment q, and define the diagonal matrix $S(f) = \text{diag}\{s_0(f), \ldots, s_{p-1}(f)\}$, then the tones received from the terminal antennas form an n×p matrix R(f) that is given by $$R(f) = H_{DL}(f)S(f) + Z(f), \quad (24)$$

where Z(f) represents the noise in the received signal matrix. The n×p matrices R(f) on the tone-frequency set F are referred to as downlink calibration tone estimates. Alternatively, the downlink calibration tone estimates may take the form of $R(f)S^{-1}(f)$ if the terminal set has the knowledge of S(f). After obtaining the downlink calibration tone estimates, the terminal set feeds these estimates back to the broadcaster set as previously described. The terminal set also transmits an uplink calibration signal for the broadcaster set to obtain the uplink channel information on F as previously described.

When the broadcaster set receives the downlink calibration tone estimates and the uplink calibration signal, the broadcaster set derives the broadcaster calibration coefficient for each calibration tone of each mapping segment. If the downlink calibration tone estimates from all n terminal antennas are available, the downlink channel at frequency f is estimated to be $$\tilde{H}_{DL}(f) = R(f)S^{-1}(f) = \begin{bmatrix} \tilde{d}_{0,0}(f) & \tilde{d}_{0,1}(f) & \ldots & \tilde{d}_{0,n-1}(f) \\ \tilde{d}_{1,0}(f) & \tilde{d}_{1,1}(f) & \ldots & \tilde{d}_{1,n-1}(f) \\ \ldots & \ldots & \ldots & \ldots \\ \tilde{d}_{p-1,0}(f) & \tilde{d}_{p-1,1}(f) & \ldots & \tilde{d}_{p-1,n-1}(f) \end{bmatrix}^T. \quad (25)$$

From the uplink calibration signal, the uplink channel at frequency f is estimated to be $$\tilde{H}_{UL}(f) = \begin{bmatrix} \tilde{u}_{0,0}(f) & \tilde{u}_{0,1}(f) & \ldots & \tilde{u}_{0,n-1}(f) \\ \tilde{u}_{1,0}(f) & \tilde{u}_{1,1}(f) & \ldots & \tilde{u}_{1,n-1}(f) \\ \ldots & \ldots & \ldots & \ldots \\ \tilde{u}_{p-1,0}(f) & \tilde{u}_{p-1,1}(f) & \ldots & \tilde{u}_{p-1,n-1}(f) \end{bmatrix}. \quad (26)$$

Given the estimated downlink and uplink channels $\tilde{H}_{DL}(f)$ and $\tilde{H}_{UL}(f)$, the broadcaster and terminal calibration matrices B(f) and T(f) can be estimated by finding the solution to the constrained least-square (LS) problem in Eq. (13). Note that the constraint $t_0(f)=1$ in Eq. (13) may also be made on another antenna. The broadcaster calibration matrix B(f) is given by $$B(f) = \text{diag}\{b(0,f), \ldots, b(p-1,f)\}, \quad (27)$$

where b(q, f) denotes the broadcaster calibration coefficient at frequency f and mapping segment q. If n=1, the solution to Eq. (13) is given by $$\tilde{b}(q, f) = \frac{\tilde{d}_{q,0}(f)}{\tilde{u}_{q,0}(f)}, q = 0, 1, \ldots, p-1. \quad (28)$$

For n>1, let $\tilde{t}(f) = [\tilde{t}_1(f), \ldots, \tilde{t}_{n-1}(f)]^T$ be the vector of the terminal calibration coefficients of the constrained LS solution, then $\tilde{t}(f)$ is given by $$\tilde{t}(f) = M^{-1}(f)v(f), \quad (29)$$

where the (i, j)-th element of the (n−1)×(n−1) matrix M(f) is given as $$\{M(f)\}_{i,j} = \sum_{q=0}^{p-1} \left[ |\tilde{d}_{i,q}(f)|^2 \delta_{i-j} - \frac{\tilde{u}_{q,i}(f)\tilde{d}_{i,q}^*(f)\tilde{d}_{j,q}(f)\tilde{u}_{q,i}^*(f)}{\sum_{l=0}^{n-1} |\tilde{u}_{q,l}(f)|^2} \right], \quad (30)$$

with $\delta_i$ being one only when i=0 and zero everywhere else, and the i-th element of the vector v(f) is given as $$\{v(f)\}_i = \sum_{q=0}^{p-1} \frac{\tilde{u}_{q,i}(f)\tilde{d}_{i,q}^*(f)\tilde{d}_{0,q}(f)\tilde{u}_{q,0}^*(f)}{\sum_{l=0}^{n-1} |\tilde{u}_{q,l}(f)|^2}. \quad (31)$$

With the terminal calibration coefficients given in Eq. (29) and $\tilde{t}_0(f)=1$, the constrained LS solution of the broadcaster calibration coefficients are given as $$\tilde{b}(q, f) = \frac{1}{\sum_{i=0}^{n-1} |\tilde{u}_{q,i}(f)|^2} \sum_{i=0}^{n-1} \tilde{d}_{i,q}(f)\tilde{u}_{q,i}^*(f)\tilde{t}_i(f). \quad (32)$$

It should be noted that if the constraint in Eq. (14) is used instead, the solution will be the same as Eq. (29) and Eq. (32) up to a constant factor, thus the constraint in Eq. (14) and the constraint $t_0(f)=1$ are again considered to be equivalent, as in the case of single antenna mapping. It should also be noted that with multiple antenna mappings and n>1, the effect of channel nulls caused by multipaths are significantly reduced. This can be seen from Eqs. (30)-(32) where all denominators have the form of summation of multiple positive numbers, a phenomenon commonly referred to as "antenna diversity" in the field of wireless communications, as compared to Eq. (16) and Eq. (28) where the denominators consist of only one term. To increase the benefit of antenna diversity, the broadcaster may involve additional terminals in the calibration process even if those terminals may not participate in distributed MIMO or beamforming.

Regularization parameters may be added to the denominators in Eq. (28). They may also be added to the denominators in Eqs. (30)-(32), and $M^{-1}(f)$ in Eq. (29) may be replaced by $[M(f)+\zeta((f)I]^{-1}$, to further mitigate the effect of channel nulls in the presence of antenna diversity.

When p>1 and n>1, the operations of solving the constrained problem in Eq. (13) described above solve for the terminal calibration coefficients first by Eq. (29), followed by solving for the broadcaster calibration coefficients by Eq. (32). If the terminal calibration coefficients are not needed, the broadcaster calibration coefficients can be solved first in a similar manner, and estimation of the terminal calibration coefficients can be skipped. It should be noted that the broadcaster and terminal calibration coefficients may also be obtained by other means than solving the constrained LS problem as in Eq. (13).

After the broadcaster calibration coefficients have been estimated, the broadcaster set derives the broadcaster calibration functions from the calibration coefficients as in the case of single antenna mapping. It is worth mentioning, however, that while the frequency subsets of calibration tones $F_i$ still satisfy $$\bigcup_{i=0}^{m-1} F_i = F, \tag{33}$$

they may not be disjoint as in the case in single antenna mapping. With p antenna mappings, $$F_i = \bigcup_{q=0}^{p-1} F_{q,i}, \tag{34}$$

where $F_{q,i}$ is the tone-frequency set of broadcaster antenna i and mapping segment q. Thus the number of the calibration tones from a broadcaster antenna can be as many as p times that of single antenna mapping. This increased tone density may significantly reduce the estimation error when estimating the broadcaster calibration functions from the broadcaster calibration coefficients.

Deriving the broadcaster calibration functions from the broadcaster calibration coefficients with multiple antenna mappings is similar to deriving the broadcaster calibration functions with singular antenna mapping, so is deriving the terminal broadcaster calibration functions from the terminal calibration coefficients with multiple antenna mappings. The operations of the calibration process with multiple antenna mappings are similar to the operations with single antenna mapping illustrated in FIG. 4.

In accordance with some more embodiments, deriving the broadcaster calibration functions is translated to phase-synchronizing broadcaster antennas. Let broadcaster antenna j be the reference antenna, the broadcaster calibration functions can be written as $$b_i(f)=b_j(f)\beta_{j,i}(f), i=0, 1, \ldots, m-1. \tag{35}$$

The relative broadcaster calibration function $\beta_{j,i}(f)$ may be written as $$\beta_{j,i}(f)=A_{j,i}\alpha_{j,i}(f)e^{j\phi_{j,i}(f)}. \tag{36}$$

where the term $A_{j,i}\alpha_{j,i}(f)$ is the amplitude of $\beta_{j,i}(f)$. $A_{j,i}$ is referred to as the relative amplitude gain of $\beta_{j,i}(f)$, or relative amplitude gain for short, and may change from time to time because of the gain control operations in the transceiver chains. Note that $A_{j,i}$ is independent of frequency f. $\alpha_{j,i}(f)$ is referred to as the relative amplitude profile of $\beta_{j,i}(f)$. Since the amplitude of $\beta_{j,i}(f)$ is defined by the product $A_{j,i}\alpha_{j,i}(f)$, $\alpha_{j,i}(f)$ may be normalized such that $A_{j,i}$ and $\alpha_{j,i}(f)$ is uniquely defined. One normalization condition is given as follows:

$$\frac{1}{n_f}\sum_f \alpha_{j,i}(f) = 1, \tag{37}$$

where the summation in Eq. (37) is over all frequencies of interest, and $n_f$ is the number of the frequencies of interest. The normalization in Eq. (37) makes the average of $\alpha_{j,i}(f)$ over all frequencies to be one. It should be noted that other normalization conditions of $\alpha_{j,i}(f)$ are also possible. The relative amplitude profile $\alpha_{j,i}(f)$ may be considered to be unchanged or to have a much slower rate of change compared to $\beta_{j,i}(f)$. Therefore, the information on $\alpha_{j,i}(f)$ can be extracted over multiple calibration processes with a much higher accuracy and may be assumed to be known in an individual calibration process.

The term $\phi_{j,i}(f)$ in Eq. (36) is the relative phase of broadcaster antenna i with respect to broadcaster antenna j, or the relative antenna phase for short. $\phi_{j,i}(f)$ may be written as $$\phi_{j,i}(f)=\theta_{j,i}+2\pi\tau_{j,i}f+\psi_{j,i}(f). \tag{38}$$

where $\theta_{j,i}$ is the relative phase intercept of broadcaster antenna i with respect to broadcaster antenna j, or relative antenna phase intercept for short, and $\tau_{j,i}$ is the relative delay of broadcaster antenna i with respect to broadcaster antenna j, or relative antenna delay for short. The term $\psi_{j,i}(f)$ represents the nonlinear phase in $\phi_{j,i}(f)$ and is referred to as the relative nonlinear phase. The nonlinear phase portion of the relative antenna phases may also be considered to be unchanged or to have a much slower rate of change compared to $\beta_{j,i}(f)$. Therefore, the information on $\psi_{j,i}(f)$ can also be extracted over multiple calibration processes with a much higher accuracy and may be assumed to be known in an individual calibration process. Accordingly the relative amplitude profile $\alpha_{j,i}(f)$ and the nonlinear phase $\psi_{j,i}(f)$ are referred to as the fixed/slow-varying components of $\beta_{j,i}(f)$. It should be noted that the transceiver chains of certain devices may have zero or negligible nonlinear phase.

If both $\alpha_{j,i}(f)$ and $\psi_{j,i}(f)$ are known (including zero or negligible $\psi_{j,i}(f)$), then the task of the calibration is to obtain the linear portion of the relative antenna phases and the single value of the relative gain. Accordingly the calibration with known fixed/slow-varying components of the relative broadcaster calibration functions is referred to as phase synchronization.

With known $\alpha_{j,i}(f)$ and $\psi_{j,i}(f)$, $\beta_{j,i}(f_k)$ in Eq. (36) depends on three parameters $\theta_{j,i}$, $\tau_{j,i}$ and $A_{j,i}$ that are collectively referred to as phase-synchronization parameters. Eq. (36) and Eq. (38) show that phase synchronization is a parameter estimation problem in which $\theta_{j,i}$, $\tau_{j,i}$, and $A_{j,i}$ are to be estimated. It is to be appreciated that estimating just a few parameters generally yields smaller estimation error than estimating the broadcaster calibration function over all frequencies of interest. In the descriptions below, the reference antenna is assumed to be broadcaster antenna 0 without loss of generality.

One approach to phase synchronization is to form the following optimization problems with broadcaster calibration functions $b_0(f)$ and $b_i(f)$:

$$\arg\min_{\theta_{0,i},\tau_{0,i},A_{0,i}} \sum_f |b_0(f)A_{0,i}\alpha_{0,i}(f)e^{j\psi_{0,i}(f)}e^{j(\theta_{0,i}+2\pi\tau_{0,i}f)} - b_i(f)|^2, \quad (39)$$

where the summation is over all frequencies of interest within the signal bandwidth. Finding $\theta_{0,i}$, $\tau_{0,i}$, and $A_{0,i}$ in Eq. (39) is a well-studied problem, and there are many algorithms that can be used. For example, if f is from a uniformly spaced grid, algorithms based on DFT (discrete Fourier transform) are well suited. Solving Eq. (39) for each broadcaster antenna i=1, ..., m−1 fully specifies the relative broadcaster calibration functions in Eq. (36) for the purpose of precoding.

Since the broadcaster calibration functions are obtained from the broadcaster calibration coefficients, $\theta_{0,i}$, $\tau_{0,i}$, and $A_{0,i}$ may alternatively be estimated from the broadcaster calibration coefficients $\tilde{b}_0(f)$, $f \in F_0$ and $\tilde{b}_i(f)$, $f \in F_i$. Let $G_{0,i} = F_0 \cup F_i$, and expand the estimates $\tilde{b}_0(f)$, $f \in F_0$ of the broadcaster calibration coefficients to $G_{0,i}$ by interpolating/extraploting values of $\tilde{b}_0(f)$ on every $f \in G_{0,i} \backslash F_0$ from value of $\tilde{b}_0(f)$ on $F_0$. Denote the expansion of $\tilde{b}_0(f)$ from $F_0$ to $G_{0,i}$ as $\overline{b}_0(f)$. Similarly, the broadcaster calibration coefficients $\tilde{b}_i(f)$, $f \in F$, can also be expanded to $B_{0,i}$ as $\overline{b}_i(f)$. Then $\theta_{0,i}$, $\tau_{0,i}$, and $A_{0,i}$ can be estimated by solving the following:

$$\arg\min_{\theta_{0,i},\tau_{0,i},A_{0,i}} \sum_{f \in G_{0,i}} |\overline{b}_0(f)A_{0,i}\alpha_{0,i}(f)e^{j\psi_{0,i}(f)}e^{j(\theta_{0,i}+2\pi\tau_{0,i}f)} - \overline{b}_i(f)|^2. \quad (40)$$

Figure 6:
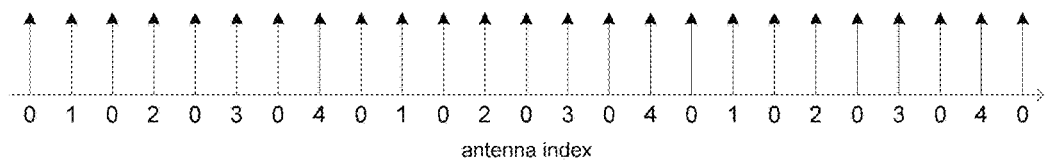
FIG. 6 illustrates an exemplary unequal antenna mapping.

Unequal antenna mapping may be used to improve the interpolation/extrapolation accuracy. In an unequal antenna mapping, the number of calibration tones are unevenly allocated to the broadcaster antennas. An exemplary unequal antenna mapping is described as follows. Let the calibration tones be uniformly spaced, i.e., the frequency $f_k$ of the k-th calibration tone is $$f_k = f_0 + k\Delta f, \quad (41)$$

where $\Delta f$ is the frequency separation between two adjacent calibration tones, and let N=2K(m−1)+1 for some integer K. The tones from broadcaster antenna 0 are mapped onto $f_{2k}$, k=0, 1, ..., K(m−1). The tones from broadcaster antenna i>0 are mapped onto $f_{2(km-k+i)+1}$, k=0, 1, ..., K−1. FIG. 6 illustrates an example of such a unequal antenna mapping with (m, K)=(5, 3). The improvement in interpolation quality is due to the closely spaced calibration tones from broadcaster antenna 0, which is used as the reference antenna. With the above unequal antenna mapping, Eq. (40) becomes Interpolation/extrapolation can be made unnecessary by using multiple unequal antenna mappings. An exemplary downlink calibration signal with multiple unequal antenna mappings is described as follows. One of the mapping segments in the downlink calibration signal carries only the calibration tones from broadcaster antenna 0. The calibration tones from the other m−1 broadcaster antennas are carried in the other mapping segments. Such antenna mappings ensure that any calibration tone from a non-reference broadcaster antenna always aligns in frequency with a calibration tone from broadcaster antenna 0. Accordingly, $\theta_{0,i}$, $\tau_{0,i}$, and $A_{0,i}$ can be estimated by solving the following:

$$\arg\min_{\theta_{0,i},\tau_{0,i},A_{0,i}} \sum_{f \in F_i} |\tilde{b}_0(f)A_{0,i}\alpha_{0,i}(f)e^{j\psi_{0,i}(f)}e^{j(\theta_{0,i}+2\pi\tau_{0,i}f)} - \tilde{b}_i(f)|^2, \quad (43)$$

in which no interpolation/extrapolation operations are needed.

Figure 7:
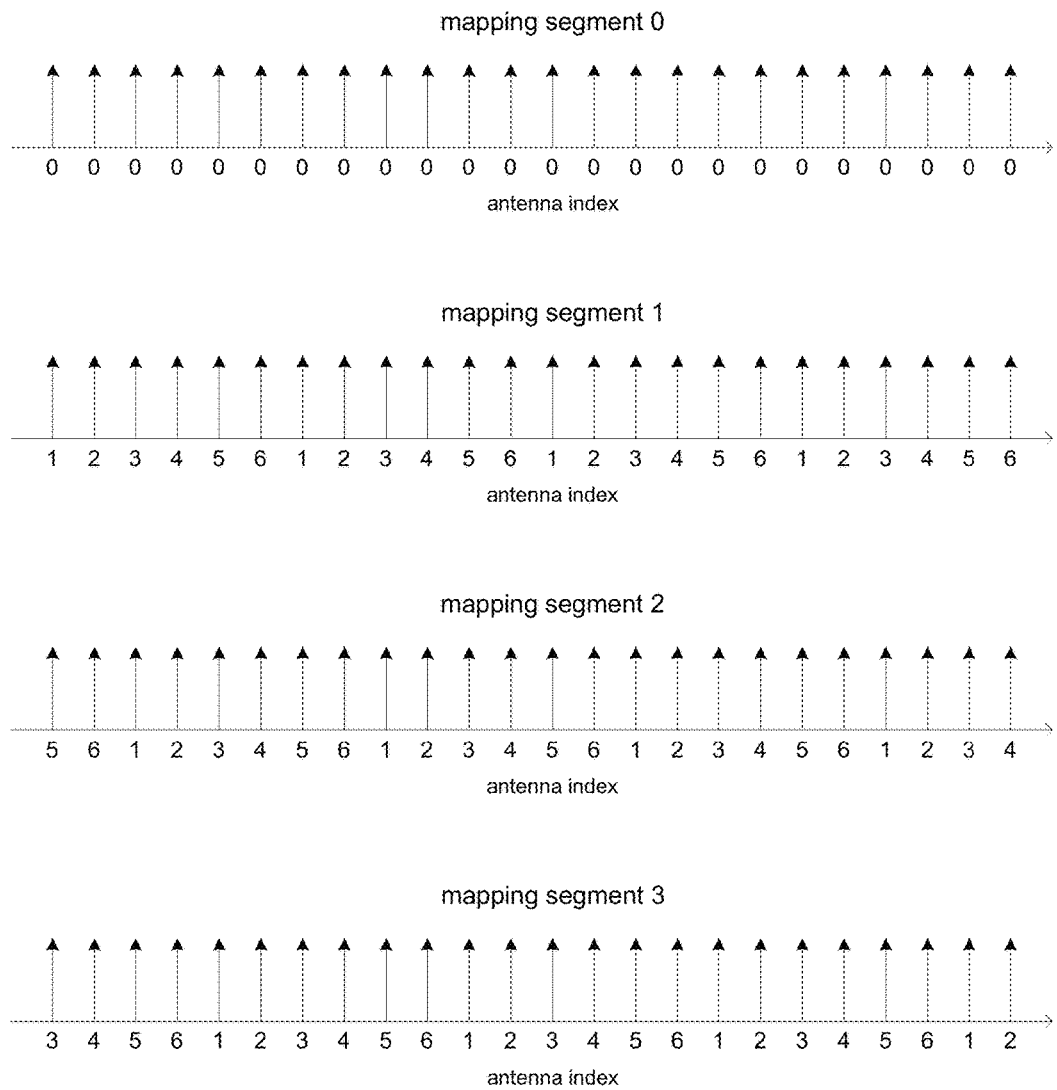
FIG. 7 illustrates an example of four unequal antenna mappings in a downlink calibration signal.

FIG. 7 illustrates an example of four unequal antenna mappings with (m, N)=(7, 25) in a downlink calibration signal. In FIG. 7, all calibration tones in mapping segment 0 are from broadcaster antenna 0. Calibration tones from broadcaster antennas 1 to 6 are distributed in mapping segments 1, 2, and 3.

It should be pointed out that a downlink calibration signal with multiple antenna mappings does not necessarily take longer time to transmit than one with single antenna mapping. In OFDM systems for example, the duration of a downlink calibration signal depends on both the number of OFDM symbols in it and the duration of each OFDM symbol. Thus if the OFDM symbols carrying the four mapping segments in FIG. 7 are four times as short as those carrying the single mapping segment in FIG. 6, the durations of the downlink calibration signals in FIG. 6 and FIG. 7 will be similar.

The initial values of the fixed/slow-varying components $\alpha_{0,i}(f)$ and $\psi_{0,i}(f)$ of $\beta_{0,i}(f)$ may be established over many calibration processes, or over some "initial" calibration processes. The initial calibration process can be designed to make the estimation of the broadcaster calibration coefficients and functions more accurate, which in turn makes the extracted $\alpha_{0,i}(f)$ and $\psi_{0,i}(f)$ more accurate. For example, an initial calibration process may include longer downlink calibration signals, may involve more terminals for feedback, may have more mapping segments, etc. Methods in the exemplary embodiments disclosed hereinabove may be used to obtain the broadcaster calibration functions from an initial calibration process.

One method of extracting $\alpha_{0,i}(f)$ and $\psi_{0,i}(f)$ from given broadcaster calibration functions $b_0(f)$ and $b_i(f)$ is described as follows. First, $A_{0,i}\alpha_{0,i}(f)$ is obtained as follows:

$$A_{0,i}\alpha_{0,i}(f) = |b_i(f)/b_0(f)| \quad (44)$$

Using the normalization condition in Eq. (37), $\alpha_{0,i}(f)$ is calculated to be $$\arg\min_{\theta_{0,i},\tau_{0,i},A_{0,i}} \sum_{f_k \in F_i} \left| \frac{\tilde{b}_0(f_{k+1}) + \tilde{b}_0(f_{k-1})}{2} A_{0,i}\alpha_{0,i}(f_k)e^{j\psi_{0,i}(f_k)}e^{j(\theta_{0,i}+2\pi\tau_{0,i}f_k)} - \tilde{b}_i(f_k) \right|^2. \quad (42)$$

$$\alpha_{0,i}(f) = \frac{n_f |b_i(f)/b_0(f)|}{\sum_x |b_i(x)/b_0(x)|}. \quad (45)$$

Next, $\theta_{0,i}$ and $\tau_{0,i}$ are obtained by solving the following:

$$\arg\max_{\theta_{0,i},\tau_{0,i}} \sum_f \text{re}\{b_0(f)b_i^*(f)A_{0,i}\alpha_{0,i}(f)e^{j(\theta_{0,i}+2\pi\tau_{0,i}f)}\}. \quad (46)$$

Lastly, $\psi_{0,i}(f)$ can be obtained from the following:

$$\alpha_{0,i}(f)e^{j\psi_{0,i}(f)} = b_i(f)e^{-j(\theta_{0,i}+2\pi\tau_{0,i}f)}/[A_{0,i}b_0(f)]. \quad (47)$$

It is to be appreciated that Eq. (47) contains complete information on $\alpha_{0,i}(f)$ and $\psi_{0,i}(f)$. The accuracy of $\alpha_{0,i}(f)$ and $\psi_{0,i}(f)$ can be further improved by averaging Eq. (47) over multiple calibration processes or over multiple initial calibration processes. It is also to be pointed out that the relative amplitude profiles and the nonlinear phases of the transceiver chains on certain devices may depend on certain operational settings of those devices, such as the gain settings. In such cases, the relative amplitude profiles and the nonlinear phases should be processed with respect to the operational settings. i.e., a relative amplitude profile and a nonlinear phase obtained under one operational setting may only be used for phase synchronization under the same operational setting, or under the operational settings where they remain valid.

It may be preferable to update $\alpha_{0,i}(f)$ and $\psi_{0,i}(f)$ in subsequent phase synchronization processes after their initial values have been established. The new information $\tilde{\alpha}_{0,i}(f)$ and $\tilde{\psi}_{0,i}(f)$ on $\alpha_{0,i}(f)$ and $\psi_{0,i}(f)$ from the latest phase synchronization process depends on the method by which $\theta_{0,i}$, $\tau_{0,i}$ and $A_{0,i}$ are estimated. As an example, if $\tilde{\theta}_{0,i}$, $\tilde{\tau}_{0,i}$, and $\tilde{A}_{0,i}$ are estimated values of $\theta_{0,i}$ and $\tau_{0,i}$ according to Eq. (39), then $\tilde{\alpha}_{0,i}(f)$ and $\tilde{\psi}_{0,i}(f)$ may be expressed as $$\tilde{\alpha}_{0,i}(f)e^{j\tilde{\psi}_{0,i}(f)} = \tilde{b}_i(f)e^{-j(\tilde{\theta}_{0,i}+2\pi\tilde{\tau}_{0,i}f)}/[\tilde{A}_{0,i}\tilde{b}_0(f)], f \in G_{0,i}. \quad (48)$$

As another example, if $\tilde{\theta}_{0,i}$ and $\tilde{\tau}_{0,i}$ are estimated from Eq. (42), then $$\tilde{\alpha}_{0,i}(f)e^{j\tilde{\psi}_{0,i}(f)} = \tilde{b}_i(f)e^{-j(\tilde{\theta}_{0,i}+2\pi\tilde{\tau}_{0,i}f)}/[\tilde{A}_{0,i}\tilde{b}_0(f)], f \in F_i. \quad (49)$$

$\alpha_{0,i}(f)$ and $\psi_{0,i}(f)$ may be updated with the new information $\tilde{\alpha}_{0,i}(f)$ and $\tilde{\psi}_{0,i}(f)$ as follows:

$$\alpha_{0,i}(f)e^{j\psi_{0,i}(f)} \leftarrow (1-\rho)\alpha_{0,i}(f)e^{j\psi_{0,i}(f)} + \rho\tilde{\alpha}_{0,i}(f)e^{j\tilde{\psi}_{0,i}(f)}, f \in F_i, \quad (50)$$

where $0<\rho<1$ is generally chosen to be very small. An example of the range for $\rho$ is $\rho=0.001\sim0.1$, Other values of $\rho$, however, may also be possible.

The update operation in Eq. (46) is constrained on $F_i$. The constraint may be removed if the new information $\tilde{\alpha}_{0,i}(f)$ and $\tilde{\psi}_{0,i}(f)$ on $F_i$ is expanded onto all frequencies of interest. It is worth noting that the normalization condition such as Eq. (37) need to be maintained during the update operations.

Alternatively, the update operations can be carried out on a block basis. Given an interval defined by the time elapsed or by the number of phase synchronization processes, the phase synchronization process uses the same $\alpha_{0,i}(f)$ and $\psi_{0,i}(f)$ within the interval. Meanwhile the new information $\tilde{\alpha}_{0,i}(f)$ and $\tilde{\psi}_{0,i}(f)$ are accumulated during the interval, and at the end of the interval, a new set of $\alpha_{0,i}(f)$ and $\psi_{0,i}(f)$ is derived from the accumulated $\tilde{\alpha}_{0,i}(f)$ and $\tilde{\psi}_{0,i}(f)$. That new set of $\alpha_{0,i}(f)$ and $\psi_{0,i}(f)$ will then be used by the phase synchronization processes in the next interval. Alternatively, the new set of $\alpha_{0,i}(f)$ and $\psi_{0,i}(f)$ may be combined with previous sets of $\alpha_{0,i}(f)$ and $\psi_{0,i}(f)$ to form a new combined set of $\alpha_{0,i}(f)$ and $\psi_{0,i}(f)$ that will then be used by the phase synchronization processes in the next interval.

Figure 8:
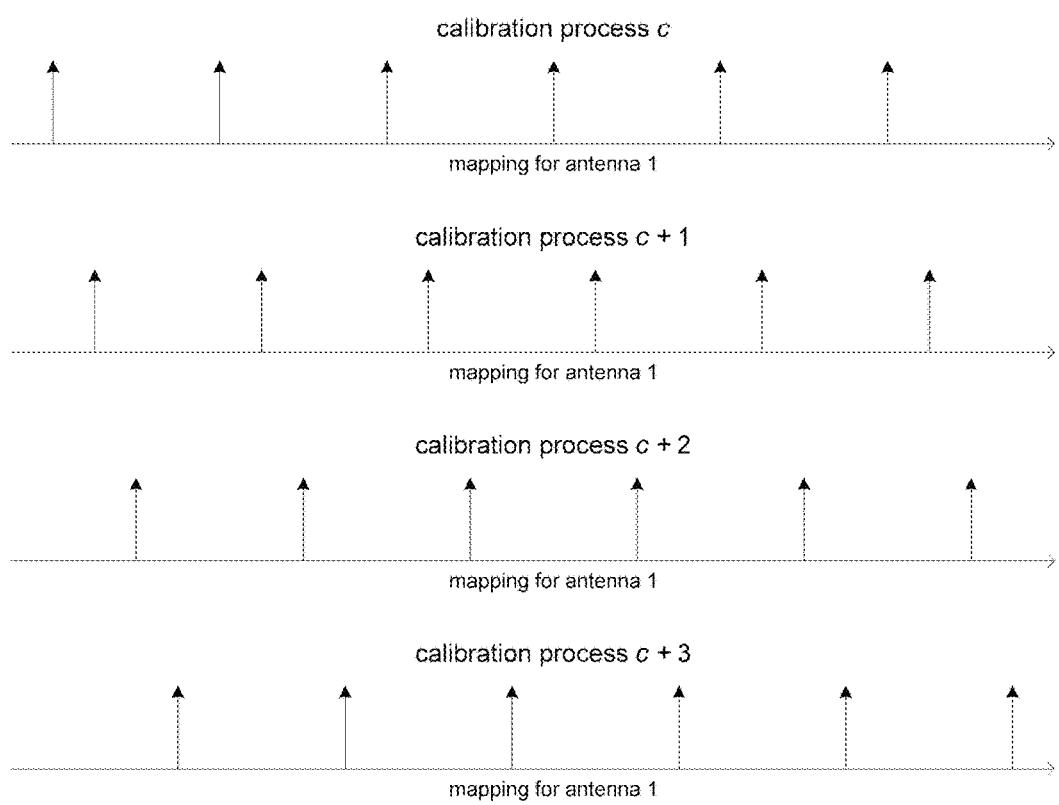
FIG. 8 illustrates an example of antenna mappings that vary with a sequence of calibration processes.

Since the fixed/slow-varying components $\alpha_{0,i}(f)$ and $\psi_{0,i}(f)$ are extracted and updated over multiple calibration processes, different antenna mappings may be used such that the calibration tones of each broadcaster antenna occupy more frequency points than with fixed antenna mappings. FIG. 8 illustrates an example of antenna mappings that vary with a sequence of the calibration processes. In FIG. 8 only the mapping for antenna 1 is shown for the purpose of illustration. The mapping for antenna 1 in FIG. 8 changes its mapping pattern with calibration processes c, c+1, c+2, etc. As a result, the calibration tones from antenna 1 have a higher density in the frequency domain when accumulated over multiple calibration processes. Higher density of the calibration tones may facilitate the extraction and update of $\alpha_{0,i}(f)$ and $\psi_{0,i}(f)$.

The fixed/slow-varying components $\alpha_{0,i}(f)$ and $\psi_{0,i}(f)$ may be made parametric. As an example, $$\alpha_{0,i}(f)e^{j\psi_{0,i}(f)} = \sum_{q=0}^{Q} \alpha_{0,i,q} f^q \exp\left(j\sum_{s=2}^{S} \psi_{0,i,s} f^s\right). \quad (51)$$

where the parameters $\alpha_{0,i,q}$ and $\psi_{0,i,s}$ can be obtained by various numerical techniques. Note that the parametric model of $\alpha_{0,i}(f)$ in Eq. (51) also need to satisfy the normalization condition such as Eq. (37). A proper parametric model may further improve the accuracy of $\alpha_{0,i}(f)$ and $\psi_{0,i}(f)$. Extracting $\alpha_{0,i}(f)$ and $\psi_{0,i}(f)$ then becomes estimating parameters $\alpha_{0,i,q}$ and $\psi_{0,i,s}$, and updating $\alpha_{0,i}(f)$ and $\psi_{0,i}(f)$ becomes updating parameters $\alpha_{0,i,q}$ and $\psi_{0,i,s}$.

Nonlinear phase detection may be performed on $\psi_{0,i}(f)$ after its extraction and/or update. An example of the nonlinear phase detection is to compare the quantity $$\Psi = \sum_f |\psi_{0,i}(f)| \quad (52)$$

against a detection threshold. If $\Psi$ is below the detection threshold, then the nonlinear phase can be considered to be zero or negligible, and can thus be ignored, i.e., set $\psi_{0,i}(f)=0$, in the operations of phase synchronization described hereinabove. The detection threshold can be determined based on channel SNR, number of feedback terminal antennas, number of antenna mappings, etc.

It should be noted that the relative antenna delay $\tau_{0,i}$ may also be considered to be fixed or slow-varying under certain situations. For example, if the distance between the antennas governs the relative antenna delay, then the relative antenna delays among the antennas of a broadcaster can be considered to be fixed or slow-varying. Under such conditions, only two parameters, the relative gain $\tilde{A}_{0,i}$ and the relative antenna phase intercept $\theta_{0,i}$, need to be estimated for broadcaster antenna i in the phase synchronization process.

In accordance with some further embodiments, the broadcaster set estimates the terminal calibration coefficients and feeds them back to the terminal set with n>1 antennas. The following is an exemplary situation where feedback of the terminal calibration coefficients by the broadcaster may be desirable. A broadcaster with a large number of antennas is beamforming to a terminal with n>1 antennas such that the number of the effective broadcaster antennas is just one, i.e., m=1. Therefore the effective downlink channel has a dimension of n×1, and has the same form as the one in Eq. (9). The terminal is able to estimate the effective downlink channel from the reference signals or pilots in the beamformed signal, and perform receiver beamforming to maximize the downlink signal quality. To maximize the uplink signal quality, the terminal must perform transmitter beamforming, which requires that the terminal has the knowledge of the uplink channel, which in turn requires the knowledge of the terminal calibration functions. The broadcaster feedback will make the terminal calibration coefficients, and thus the terminal calibration functions, available to the terminal. The terminal calibration thus accomplished is termed as "broadcaster-assisted terminal calibration".

The terminal calibration coefficients can be obtained at the same time as the broadcaster calibration coefficients when solving the constrained LS problem in Eq. (13) as described hereinabove. Since the terminal calibration functions are derived from the terminal calibration coefficients, the latter contains all information of the former. Thus feeding back the terminal calibration coefficients preserves all information on terminal calibration functions. On the other hand, if the terminal calibration coefficients can be modeled by a family of functions with just a few parameters, feeding back those parameters may reduce the feedback overhead. As an example, the parametric model in Eq. (18) for the broadcaster calibration functions can also be used to model the terminal calibration coefficients.

The terminal calibration coefficients for one of the terminal antennas can be made to be one, similar to the constraint in Eq. (13). Then the terminal calibration coefficients for the other terminal antennas need to be scaled accordingly. The terminal calibration coefficients thus obtained can also be called the relative terminal calibration coefficients.

Figure 9:
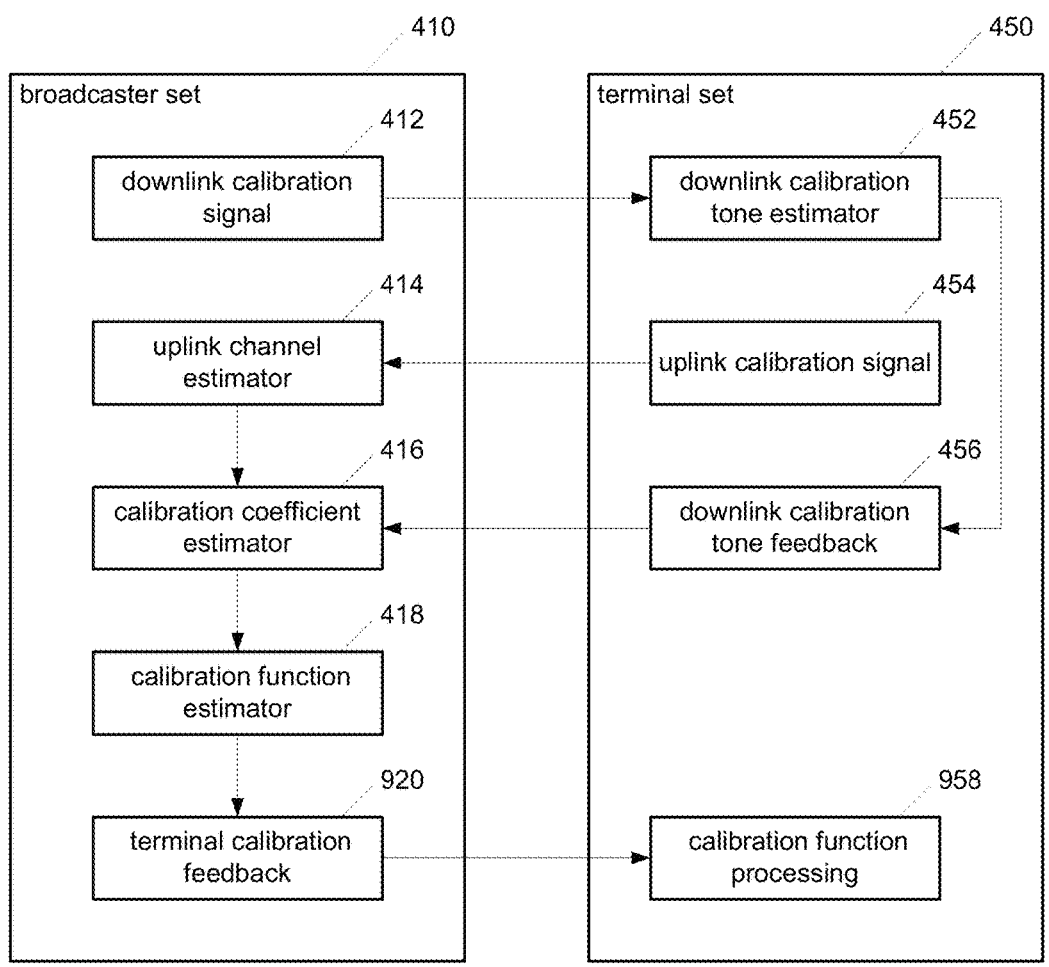
FIG. 9 illustrates an example diagram of terminal-assisted calibration with broadcaster feedback.

FIG. 9 illustrates an example diagram of terminal-assisted calibration with broadcaster feedback. Compared to FIG. 4, broadcaster set 410 in FIG. 9 adds terminal calibration feedback apparatus 920, and terminal set 450 in FIG. 9 adds calibration function processing apparatus 958. In FIG. 9, the operations of obtaining the broadcaster and terminal calibration coefficients and functions are the same as those in FIG. 4. Terminal calibration feedback apparatus 920 sends the information on the terminal calibration coefficients to calibration function processing apparatus 958. The information to be fed back may be the terminal calibration coefficients on the tone-frequency set F, or the terminal calibration coefficients on a subset of F, or the parameters of the terminal calibration coefficients if they are expressed in parametric models. Calibration function processing apparatus 958 receives the information sent by calibration function feedback apparatus 920 and reconstructs the terminal calibration functions.

Conclusion, Ramifications, and Scope

Accordingly it will be seen that the terminal-assisted channel reciprocity calibration and phase synchronization provides necessary information for precoding in distributed MIMO, multiuser MIMO, and massive antenna beamforming, etc., demonstrates salient advantages, and overcomes the prominent drawbacks of the existing art.

The terminal-assisted calibration is able to calibrate large number of broadcaster antennas in large-scale MIMO and massive-antenna beamforming. Hundreds of broadcaster antennas can be calibrated with a downlink calibration signal of only tens of microseconds, thereby maintaining extremely low overhead and achieving high efficiency.

Multiple antenna mappings in the downlink calibration signal of the terminal-assisted calibration allows improved the calibration quality and, when there is more than one terminal antenna, enables antenna diversity to mitigate the channel nulls in multipath channels.

Methods are disclosed to extract the relative amplitude profiles and nonlinear phases of the relative broadcaster calibration functions. With the knowledge of the relative amplitude profiles and nonlinear phases, the calibration problem turns into the phase synchronization problem, in which only two or three parameters are to be estimated between a non-reference broadcast antenna and the reference broadcaster antenna, thereby significantly improving the calibration quality.

The broadcaster-assisted terminal calibration can be carried out as additional operations of the terminal-assisted broadcaster calibration, which enables the terminal to perform the uplink beamforming.

The terminal-assisted calibration overcomes the drawbacks of the self-calibration. The lengthy and exhaustive calibrations with respect to all operational settings are no longer needed, since the terminal-assisted calibration can simply calibrate under the operational setting for the distributed MIMO or beamforming. Repeated long calibrations are also not necessary, as the terminal-assisted calibration can be need-based. For example, there is no need for broadcaster calibration if there is no pending MIMO operations. The service disruption in the self-calibration is also eliminated since the efficient low-overhead calibration methods disclosed herein can be made to be an integral part of the MIMO operations. Further, the terminal-assisted calibration is able to jointly calibrate distributed (non-colocated) broadcasters, thereby making the distributed MIMO possible. The self-calibration, on the other hand, is unable to do so.

It is to be appreciated that the subject matter claimed herein is not limited to individually adjustable antennas. As stated in the specifications, it is also applicable to effective antennas, each of which may be composed of multiple individual physical antennas, and to various antenna arrays, including phased arrays. The broadcasters can also be a cluster of wireless devices that are desired to be frequency and/or phase synchronized.

While the foregoing disclosure describes illustrative aspects and/or embodiments, it should be noted that various changes and modifications could be made herein by those skilled in the art without departing from the scope of the described aspects and/or embodiments as defined by the appended claims. Furthermore, all or a portion of any aspect and/or embodiment can be utilized with all or a portion of any other aspect and/or embodiment, unless stated otherwise. It is, therefore, to be understood that the appended claims are intended to cover all such modifications, changes, and combinations as fall within the true spirit and the scope of the disclosed subject matter.

What is claimed is:

1. A method of phase synchronization and channel reciprocity calibration in a TDD wireless communications network with a predetermined signal bandwidth, wherein said network comprises at least one broadcaster set and at least one terminal set, said broadcaster set comprising at least one broadcaster and a plurality of broadcaster antennas, said terminal set comprising at least one terminal and at least one terminal antenna, comprising:
    (a) sending a downlink calibration signal from said broadcaster set to said terminal set, wherein said downlink calibration signal comprises at least one antenna mapping and a plurality of calibration tones from said broadcaster antennas,
    (b) sending an uplink calibration signal from said terminal set to said broadcaster set, (c) obtaining a plurality of downlink calibration tone estimates from said downlink calibration signal at said terminal set, (d) sending said plurality of said downlink calibration tone estimates from said terminal set to said broadcaster set, (e) deriving a plurality of broadcaster calibration coefficients for said plurality of said calibration tones from said uplink calibration signal and said plurality of said downlink calibration tone estimates at said broadcaster set, and (f) obtaining a plurality of broadcaster calibration functions within said predetermined signal bandwidth from said plurality of said broadcaster calibration coefficients at said broadcaster set, wherein each of said broadcaster calibration functions is associated with one of said broadcaster antennas.

2. The method of claim 1, wherein said downlink calibration signal comprises at least one OFDM symbol, said OFDM symbol comprising a plurality of subcarriers as said plurality of said calibration tones.

3. The method of claim 1, wherein said downlink calibration signal comprises more than one said antenna mapping.

4. The method of claim 1, wherein said downlink calibration signal comprises a plurality of unequal antenna mappings.

5. The method of claim 1, wherein deriving said plurality of said broadcaster calibration coefficients comprises solving a constrained least-square problem.

6. The method of claim 1, wherein deriving said plurality of said broadcaster calibration coefficients comprises solving a constrained least-square problem with at least one regularization parameter.

7. The method of claim 1, wherein obtaining said plurality of broadcaster calibration functions comprises interpolation/extrapolation.

8. The method of claim 1, wherein obtaining said plurality of broadcaster calibration functions comprises model fitting.

9. The method of claim 1, wherein obtaining said plurality of broadcaster calibration functions comprises:

(g) obtaining fixed/slow-varying components of a plurality of relative broadcaster calibration functions, and (h) estimating phase synchronization parameters of said plurality of said relative broadcaster calibration functions.

10. The method of claim 9, wherein said fixed/slow-varying components comprises relative amplitude profiles and relative nonlinear phases.

11. The method of claim 9, wherein said phase synchronization parameters comprises relative antenna phase intercept, relative antenna delay, and relative amplitude gain.

12. The method of claim 9, wherein obtaining said plurality of broadcaster calibration functions further comprises extracting said fixed/slow-varying components of said plurality of said relative calibration functions.

13. The method of claim 9, wherein obtaining said plurality of broadcaster calibration functions further comprises updating said fixed/slow-varying components of said plurality of said relative calibration functions.

14. The method of claim 1, wherein said terminal set comprising more than one said terminal antenna, further comprising:

(i) deriving a plurality of terminal calibration coefficients for said plurality of said calibration tones from said uplink calibration signal and said plurality of said downlink calibration tone estimates at said broadcaster set, and (j) sending information on said plurality of said terminal calibration coefficients from said broadcaster set to said terminal set, wherein said information on said plurality of said terminal calibration coefficients comprises one of the following:

(1) said plurality of said terminal calibration coefficients on a tone-frequency set, (2) a portion of said plurality of said terminal calibration coefficients on a subset of said tone-frequency set, and (3) parameters of parametric models of said plurality of said terminal calibration coefficients.

15. An apparatus for phase synchronization and channel reciprocity calibration in a TDD wireless communications network with a predetermined signal bandwidth, wherein said network comprises at least one broadcaster set and at least one terminal set, said broadcaster set comprising at least one broadcaster and a plurality of broadcaster antennas, said terminal set comprising at least one terminal and at least one terminal antenna, comprising:

(a) a first downlink transmitter for sending a downlink calibration signal from said broadcaster set to said terminal set, wherein said downlink calibration signal comprises at least one antenna mapping and a plurality of calibration tones from said broadcaster antennas, (b) a first uplink transmitter for sending an uplink calibration signal from said terminal set to said broadcaster set, (c) a calibration tone estimator for obtaining a plurality of downlink calibration tone estimates from said downlink calibration signal at said terminal set, (d) a second uplink transmitter for sending said plurality of said downlink calibration tone estimates from said terminal set to said broadcaster set, (e) a broadcaster calibration coefficient estimator for deriving a plurality of broadcaster calibration coefficients for said plurality of said calibration tones from said uplink calibration signal and said plurality of said downlink calibration tone estimates at said broadcaster set, and (f) a calibration function estimator for obtaining a plurality of broadcaster calibration functions within said predetermined signal bandwidth from said plurality of said broadcaster calibration coefficients at said broadcaster set, wherein each of said broadcaster calibration functions is associated with one of said broadcaster antennas.

16. The apparatus of claim 15, wherein said broadcaster calibration coefficient estimator comprises a constrained least-square problem solver.

17. The apparatus of claim 15, wherein said broadcaster calibration coefficient estimator comprises a constrained least-square problem solver with at least one regularization parameter.

18. The apparatus of claim 15, wherein said calibration function estimator comprises an interpolator and an extrapolator.

19. The apparatus of claim 15, wherein said calibration function estimator comprises a model parameter estimator for estimating parameters in model fitting.

20. The apparatus of claim 15, wherein said calibration function estimator comprises:

(g) a fixed/slow-varying component processor for obtaining fixed/slow-varying components of a plurality of relative broadcaster calibration functions, and (h) a phase-sync parameter estimator for estimating phase synchronization parameters of said plurality of said relative broadcaster calibration functions.

21. The apparatus of claim 20, wherein said fixed/slow-varying components comprises relative amplitude profiles and relative nonlinear phases.

22. The apparatus of claim 20, wherein said phase synchronization parameters comprises relative antenna phase intercept, relative antenna delay, and relative amplitude gain.

23. The apparatus of claim 20, wherein said fixed/slow-varying component processor further comprises a fixed/slow-varying component extractor for extracting said fixed/slow-varying components of said plurality of said relative calibration functions.

24. The apparatus of claim 20, wherein said fixed/slow-varying component processor further comprises a fixed/slow-varying component updater for updating said fixed/slow-varying components of said plurality of said relative calibration functions.

25. The method of claim 15, wherein said terminal set comprising more than one said terminal antenna, further comprising:

(i) a terminal coefficient estimator for deriving a plurality of terminal calibration coefficients for said plurality of said calibration tones from said uplink calibration signal and said plurality of said downlink calibration tone estimates at said broadcaster set, and (j) a second downlink transmitter for sending information on said plurality of said terminal calibration coefficients from said broadcaster set to said terminal set, wherein said information on said plurality of said terminal calibration coefficients comprises one of the following:

(1) said plurality of said terminal calibration coefficients on a tone-frequency set, (2) a portion of said plurality of said terminal calibration coefficients on a subset of said tone-frequency set, and (3) parameters of parametric models of said plurality of said terminal calibration coefficients.

* * * * *